(12) United States Patent
Tsuchiya et al.

(10) Patent No.: US 10,614,321 B2
(45) Date of Patent: Apr. 7, 2020

(54) TRAVEL LANE DETECTION METHOD AND TRAVEL LANE DETECTION DEVICE

(71) Applicant: Nissan Motor Co., Ltd., Yokohama-shi, Kanagawa (JP)

(72) Inventors: Chikao Tsuchiya, Kanagawa (JP); Yasuhito Sano, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/087,477

(22) PCT Filed: Mar. 24, 2016

(86) PCT No.: PCT/JP2016/059397
§ 371 (c)(1),
(2) Date: Sep. 21, 2018

(87) PCT Pub. No.: WO2017/163367
PCT Pub. Date: Sep. 28, 2017

(65) Prior Publication Data
US 2019/0095723 A1    Mar. 28, 2019

(51) Int. Cl.
*G06K 9/00* (2006.01)
*G06T 7/60* (2017.01)
*G08G 1/16* (2006.01)
*G06K 9/62* (2006.01)
*G06T 7/70* (2017.01)
*B60W 30/12* (2020.01)

(52) U.S. Cl.
CPC ......... *G06K 9/00798* (2013.01); *B60W 30/12* (2013.01); *G06K 9/0053* (2013.01); *G06K 9/6221* (2013.01); *G06T 7/60* (2013.01); *G06T 7/70* (2017.01); *G08G 1/16* (2013.01); *G06T 2207/30256* (2013.01)

(58) Field of Classification Search
CPC ............................................ G06T 2207/30256
See application file for complete search history.

(56) References Cited

U.S. PATENT DOCUMENTS 5,638,116 A * 6/1997 Shimoura ............ G05D 1/0246
348/118
5,991,427 A * 11/1999 Kakinami ............ G06K 9/4604
340/903

(Continued)

FOREIGN PATENT DOCUMENTS

JP    2001236506 A    8/2001
JP    2005100000 A    4/2005
(Continued)

*Primary Examiner* — Avinash Yentrapati
(74) *Attorney, Agent, or Firm* — Young Basile Hanlon & MacFarlane, P.C.

(57) ABSTRACT

A travel lane detection method overlaps a plurality of travel lane boundary point groups parallel to each other, extracted according to continuity of a plurality of travel lane characteristic points detected by a target detection sensor installed in a vehicle, estimates a travel lane outline according to the travel lane characteristic points included in the overlapped travel lane boundary point groups, and determines travel lane boundaries based on lateral positions of the travel lane boundary point groups parallel to each other and the estimated travel lane outline.

5 Claims, 15 Drawing Sheets

(56) References Cited

U.S. PATENT DOCUMENTS

| | | | |
|---|---|---|---|
| 6,819,779 B1* | 11/2004 | Nichani | G06K 9/00798 382/104 |
| 6,885,776 B2* | 4/2005 | Takakura | G06T 3/4038 345/629 |
| 7,583,816 B2 | 9/2009 | Kakinami et al. | |
| 2004/0119029 A1* | 6/2004 | Nagata | B82Y 10/00 250/492.22 |
| 2005/0270374 A1 | 12/2005 | Nishida et al. | |
| 2006/0239509 A1* | 10/2006 | Saito | G06K 9/00798 382/104 |
| 2007/0084655 A1* | 4/2007 | Kakinami | G06K 9/00798 180/167 |
| 2007/0107965 A1 | 5/2007 | Kakinami et al. | |
| 2007/0160939 A1* | 7/2007 | Akamatsu | H04N 1/506 430/357 |
| 2008/0068379 A1* | 3/2008 | Larsen | G06K 9/0014 345/427 |
| 2008/0317282 A1* | 12/2008 | Unoura | G06K 9/00798 382/103 |
| 2011/0052079 A1* | 3/2011 | Tamura | G06K 9/00798 382/199 |
| 2013/0016915 A1* | 1/2013 | Hashimoto | G06K 9/00798 382/218 |
| 2014/0147007 A1* | 5/2014 | Hayakawa | G08G 1/167 382/103 |
| 2014/0168440 A1* | 6/2014 | Tsuchiya | B60R 1/00 348/148 |
| 2014/0169630 A1* | 6/2014 | Fukata | G08G 1/167 382/103 |
| 2015/0294165 A1* | 10/2015 | Hilldore | G06K 9/00798 382/104 |

FOREIGN PATENT DOCUMENTS

| | | |
|---|---|---|
| JP | 2005346383 A | 12/2005 |
| JP | 2006350571 A | 12/2006 |
| JP | 2007241468 A | 9/2007 |
| JP | 2012022574 A | 2/2012 |
| JP | 2015069340 A | 4/2015 |
| KR | 20060057005 A | 5/2006 |

* cited by examiner (a)

(b)

TRAVEL LANE DETECTION METHOD AND TRAVEL LANE DETECTION DEVICE

TECHNICAL FIELD

The present invention relates to a travel lane detection method and a travel lane detection device.

BACKGROUND

A device is known to detect a travel lane from an image of a road surface (Japanese Patent Unexamined Publication No. 2005-100000). The device disclosed in Japanese Patent Unexamined Publication No. 2005-100000 generates a horizontal edge histogram for a plurality of edge points projected in reverse on coordinates of the road surface. The device then obtains peak positions in the edge histogram and makes the edge points contributing to the respective peak positions into a group, so as to detect lane markers.

However, the number of edge points detected may be decreased on a shoulder of the road since dirt tends to adhere thereto, or the number of edge points detected may be decreased as a distance from the vehicle to the edge points increases. The device disclosed in Japanese Patent Unexamined Publication No. 2005-100000 thus has a problem that lane markers parallel to each other drawn on the travel lane may be estimated in a state of not being parallel to each other.

SUMMARY

In view of the above problem, the present invention provides a travel lane detection method and a travel lane detection device capable of stably detecting outlines of travel lane boundaries.

A travel lane detection method according to an aspect of the present invention overlaps a plurality of travel lane boundary point groups parallel to each other by moving in a vehicle width direction, extracted according to continuity of a plurality of travel lane characteristic points detected by a target detection sensor installed in a vehicle, estimates a travel lane outline according to the travel lane characteristic points included in the overlapped travel lane boundary point groups, and determines travel lane boundaries by moving the estimated travel lane outline in the vehicle width direction.

The present invention can estimate outlines of travel lanes while excluding travel lane characteristic points belonging to a branch lane or the like not parallel to the other lanes. The present invention thus can detect outlines of travel lane boundaries stably.

DETAILED DESCRIPTION (First Embodiment)

Figure 1:
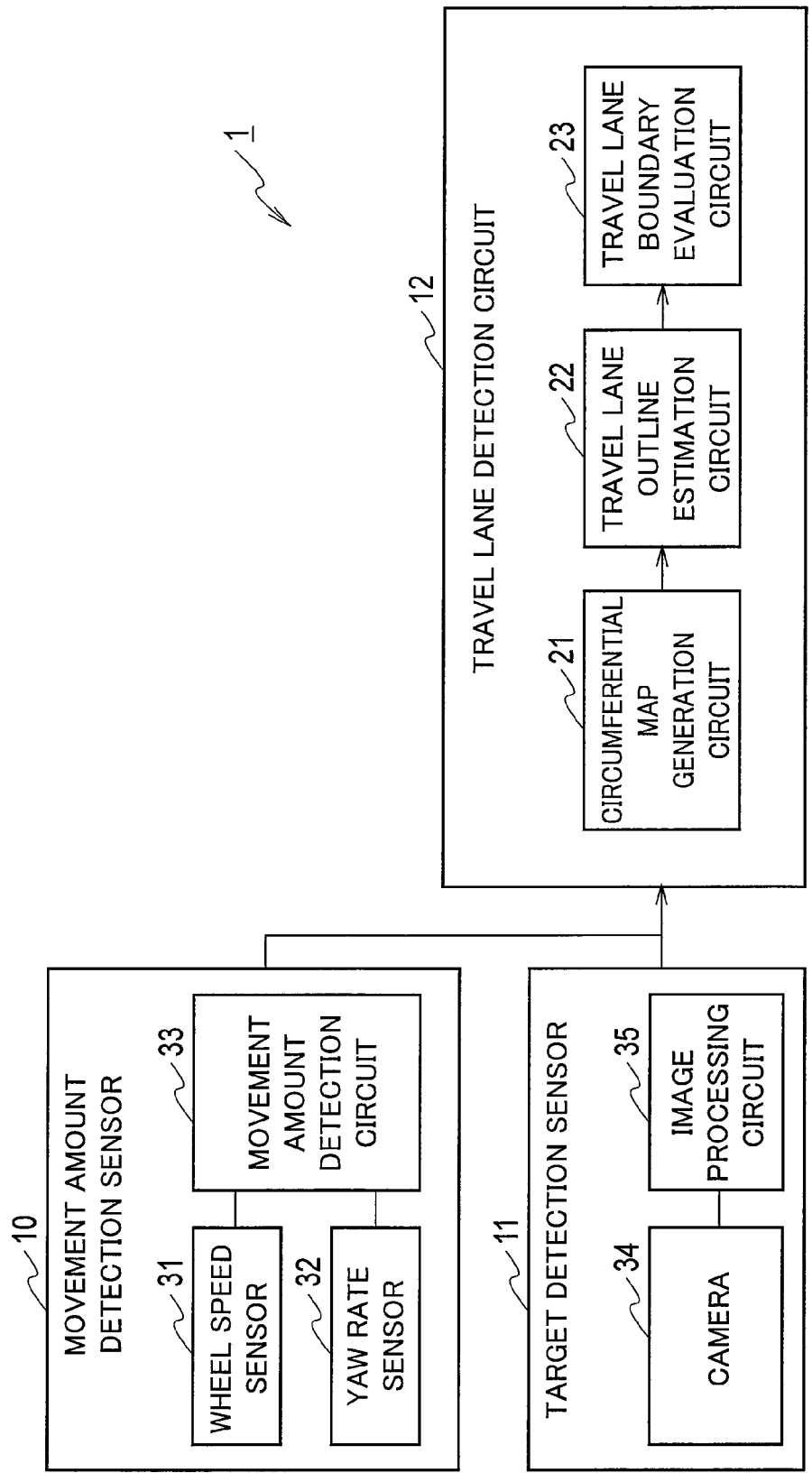
FIG. 1 is a block diagram showing a configuration of a travel lane detection device 1 according to a first embodiment.

An embodiment will be described in detail below with reference to the drawings.

A configuration of a travel lane detection device 1 according to a first embodiment is described with reference to FIG. 1. The travel lane detection device 1 detects boundaries of a travel lane in which a vehicle is traveling according to travel lane characteristic points on a road surface detected by a sensor mounted on the vehicle. The travel lane detection device 1 includes a target detection sensor 11 mounted on the vehicle, a movement amount detection sensor 10 for detecting the amount of movement of the vehicle based on a moving velocity and a yaw rate of the vehicle, and a travel lane detection circuit 12 for detecting the boundaries of the travel lane based on the travel lane characteristic points detected by the target detection sensor 11 and the amount of movement of the vehicle detected by the movement amount detection sensor 10.

The target detection sensor 11 detects white lines (including lane markers) marked on the road surface around the vehicle. The target detection sensor 11 includes a camera 34 installed in the vehicle, and an image processing circuit 35 for detecting road surface marks including the white lines from a digital image captured by the camera 34. The detected road surface marks are indicated as characteristic point groups each including a plurality of travel lane characteristic points and showing the positions of the road surface marks. The image processing circuit 35 is only required to detect points (luminance edges) of which brightness on the image varies quickly or intermittently as the travel lane characteristic points.

The movement amount detection sensor 10 includes a wheel speed sensor 31, a yaw rate sensor 32, and a movement amount detection circuit 33. The wheel speed sensor 31 detects a rotational speed of the wheels of the vehicle. The yaw rate sensor 32 detects a yaw rate of the vehicle. The movement amount detection circuit 33 detects the amount of movement of the vehicle for a predetermined period of time according to the rotational speed of the wheels and the yaw rate of the vehicle. The amount of movement of the vehicle includes a moving direction and a moving distance of the vehicle, for example.

The travel lane detection circuit 12 may be a microcomputer including a central processing unit (CPU), a memory, and an input/output unit. A computer program (a travel lane detection program) for causing the microcomputer to serve as the travel lane detection circuit 12 is installed to be executed in the microcomputer. Accordingly, the microcomputer functions as the travel lane detection circuit 12. While the present embodiment is illustrated with the case in which the software is installed to fabricate the travel lane detection circuit 12, it should be understood that dedicated hardware for executing each information processing as described below can be prepared to compose the travel lane detection circuit 12. A plurality of circuits (21, 22, 23) included in the travel lane detection circuit 12 may each be composed of individual hardware. In addition to the travel lane detection circuit 12, the image processing circuit 35 and the movement amount detection circuit 33 may each be composed of software or dedicated hardware. The travel lane detection circuit 12 may also serve as an electronic control unit (ECU) used for other control processing in the vehicle.

The travel lane detection circuit 12 includes a circumferential map generation circuit 21, a travel lane outline estimation circuit 22, and a travel lane boundary evaluation circuit 23. The circumferential map generation circuit 21 generates a map around the circumference of the vehicle (a first circumferential map) composed of characteristic point groups obtained such that detection histories of the characteristic point groups detected by the target detection sensor 11 are connected together according to the amount of movement of the vehicle for a period during which each characteristic point group is detected. Namely, the circumferential map generation circuit 21 connects the respective travel lane characteristic points together measured at different times while taking account of the amount of movement of the vehicle. The circumferential map generation circuit 21 thus accumulates the detection histories of the travel lane characteristic points to generate the first circumferential map.

In particular, the camera 34 captures an image of a road surface around the circumference of the vehicle per predetermined time. The movement amount detection sensor 10 detects the moving direction and the moving distance of the vehicle for the predetermined time. The circumferential map generation circuit 21 moves the positions of the travel lane characteristic points by the moving distance of the vehicle in the direction opposite to the moving direction of the vehicle. The circumferential map generation circuit 21 repeats this operation and connects the plural travel lane characteristic points together measured at different times while taking account of the amount of movement of the vehicle, so as to accumulate the detection histories of the travel lane characteristic points to generate the first circumferential map.

Figure 3A:
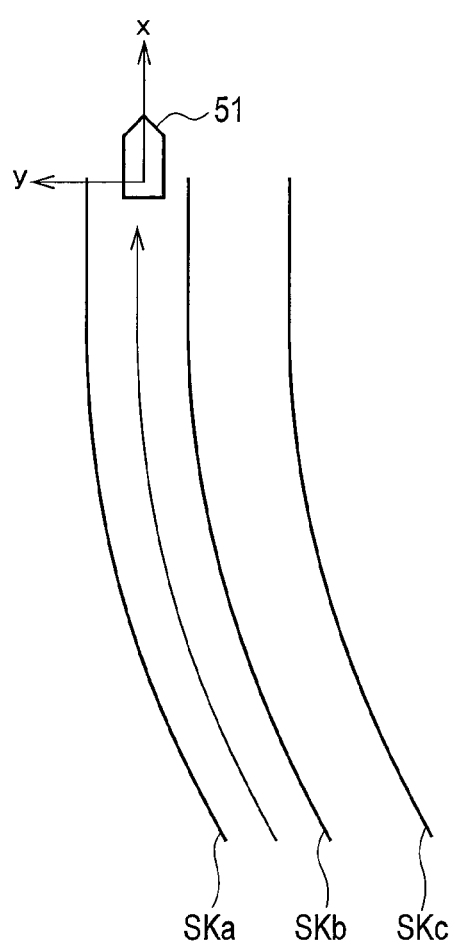
FIG. 3A is a bird's-eye view showing a state in which a vehicle 51 is traveling on the left side of a two-lane road slightly curving to the right.

As shown in FIG. 3A, a vehicle 51 is traveling on the left side of a two-lane road slightly curving to the right. FIG. 3A illustrates three travel lane boundaries (SKa, SKb, and SKc) defining the two-lane road. The first circumferential map generated by the circumferential map generation circuit 21 includes characteristic point groups (not shown) detected along the three travel lane boundaries (SKa, SKb, and SKc). The present embodiment uses plane coordinates in which the traveling direction of the vehicle 51 is defined as an x-axis, and the width direction of the vehicle 51 is defined as a y-axis, on the basis of the position of the vehicle 51 which is the origin of the two axes.

The travel lane outline estimation circuit 22 extracts a travel lane boundary group in accordance with continuity of a plurality of travel lane characteristic points included in the first circumferential map. When a plurality of travel lane boundary groups parallel to each other are extracted, the travel lane outline estimation circuit 22 overlaps the plural travel lane boundary groups parallel to each other, and estimates travel lane outlines based on the travel lane characteristic points included in the overlapped travel lane boundary groups. The following are details of the processing operation of the travel lane outline estimation circuit 22.

The travel lane outline estimation circuit 22 determines the continuity of the plural travel lane characteristic points according to a frequency on the coordinate in the vehicle width direction (the y-axis direction). For example, the travel lane outline estimation circuit 22 generates a second circumferential map in which the position of the vehicle 51 is the origin, the width direction of the vehicle 51 is the y-axis, and the axis orthogonal to the y-axis is a time axis (a t-axis), without taking account of the amount of movement of the vehicle 51. The travel lane outline estimation circuit 22 plots, on the second circumferential map, a plurality of travel lane characteristic points FP included in the first circumferential map shown in FIG. 3A, in accordance with the detection time (t) and the positions (the y-coordinates) in the vehicle width direction, as shown in FIG. 3B(a).

Figure 3B:
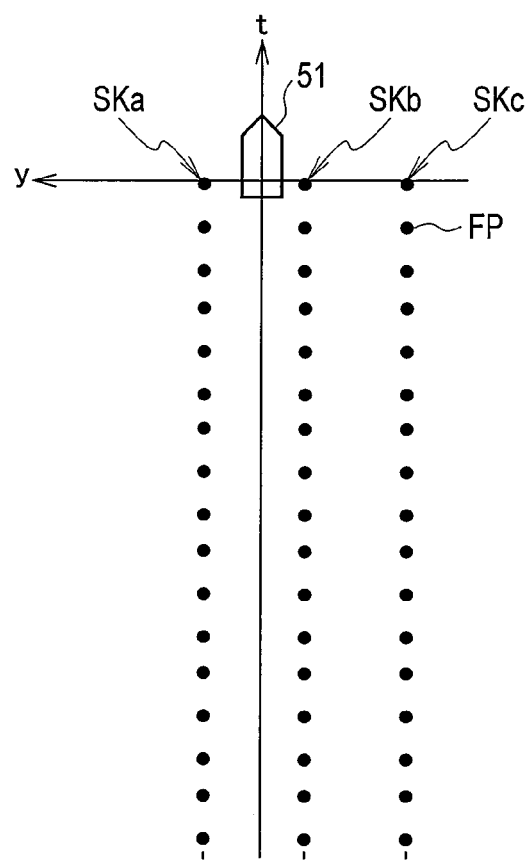
FIG. 3B(a) is a bird's-eye view illustrating a second circumferential map generated from a first circumferential map shown in FIG. 3A, and FIG. 3B(b) is a graph illustrating a histogram generated from the second circumferential map in FIG. 3B(a)
Figure 3B:
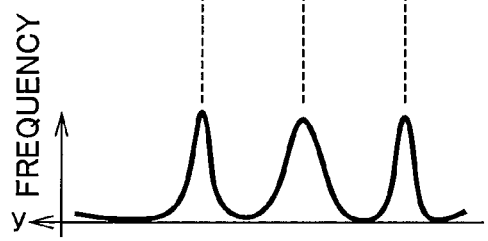

When the vehicle 51 is traveling along the travel lanes as shown in FIG. 3A, the positions (the y-coordinates) of the travel lane characteristic points FP in the vehicle width direction are constant, as shown in the second circumferential map in FIG. 3B(a), since the amount of movement of the vehicle 51 is not taken into account with respect to the time axis (the t-axis). Therefore, the travel lane characteristic points FP are plotted along the straight lines parallel to the t-axis, regardless of the road shape (a slight right-hand curve).

The travel lane outline estimation circuit 22 votes the travel lane characteristic points FP shown in the second circumferential map to the one-dimensional histogram along the y-axis, as shown in FIG. 3B(b). The travel lane outline estimation circuit 22 can determine the continuity of the travel lane characteristic points FP from the histogram.

The travel lane outline estimation circuit 22 detects peaks in the histogram (the y-coordinates) and groups the travel lane characteristic points FP on the second circumferential map per peak, so as to extract travel lane boundary point groups. The grouping of the travel lane characteristic points FP on the second circumferential map is easier than the grouping of the travel lane characteristic points FP on the first circumferential map. Each of the grouped travel lane characteristic points FP composes a single travel lane boundary point group. The grouping by use of the histogram allows the travel lane outline estimation circuit 22 to extract a plurality of travel lane boundary point groups parallel to each other simultaneously. Instead of the use of the histogram, the travel lane outline estimation circuit 22 may cause curves to approximate to the travel lane characteristic points FP, by use of a known method so as to fit a plurality of curves to the boundary point groups. The travel lane outline estimation circuit 22 may then determine whether the fitted curves are parallel to each other.

Subsequently, the travel lane outline estimation circuit 22 fits a curve expressed by a road model function to the respective travel lane boundary point groups on the first circumferential map. The road model function is a cubic function ($y=ax^3+bx^2+cx+d$), for example. The travel lane outline estimation circuit 22 calculates the coefficients a, b, c, and d of the cubic function. Although function fitting by least squares may be applied to the calculation, robust estimation such as random sample consensus (RANSAC) may be used in order to improve stability.

The travel lane outline estimation circuit 22 determines whether the plural travel lane boundary point groups parallel to each other are extracted. In particular, the travel lane outline estimation circuit 22 determines that the plural travel lane boundary point groups parallel to each other are extracted when different road model functions are fitted in which the respective coefficients a, b, and c are substantially the same and the coefficients d vary. Alternatively, the travel lane outline estimation circuit 22 may determine whether two or more peaks are detected in the histogram.

Figure 4A:
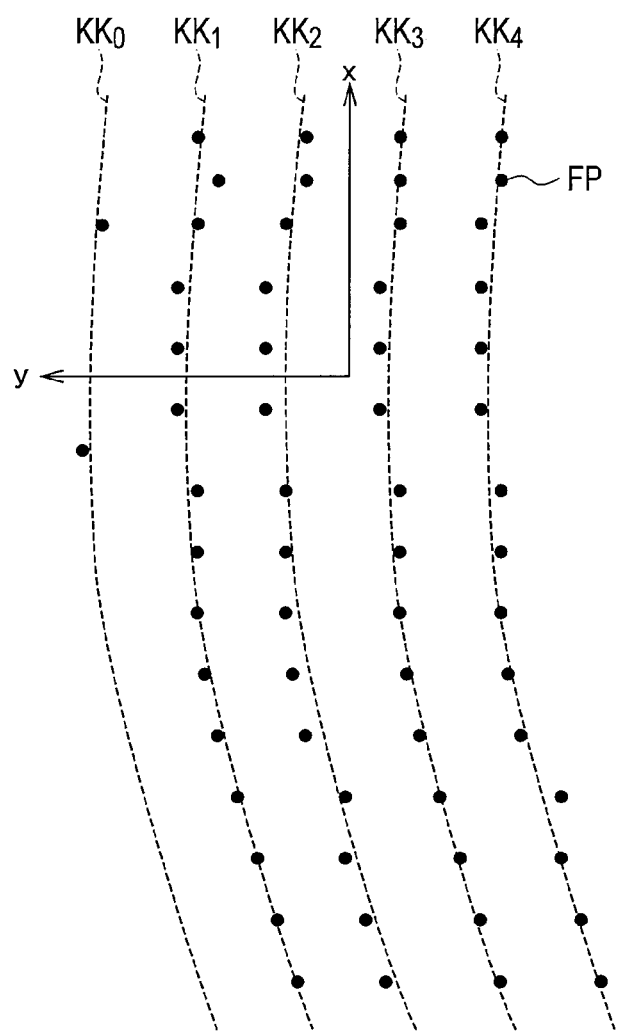
FIG. 4A is a bird's-eye view showing five road model functions ($KK_0$, $KK_1$, $KK_2$, $KK_3$, $KK_4$) fitted to a plurality of travel lane boundary point groups parallel to each other, and travel lane characteristic points FP included in the respective travel lane boundary point groups.

The bird's-eye view shown in FIG. 4A illustrates five road model functions ($KK_0$, $KK_1$, $KK_2$, $KK_3$, and $KK_4$) fitted to the travel lane boundary point groups parallel to each other, and the travel lane characteristic points FP included in the respective travel lane boundary point groups. The five road model functions ($KK_0$ to $KK_4$) are as follows:

$KK_0: y=ax^3+bx^2+cx+d_0$ $KK_1: y=ax^3+bx^2+cx+d_1$ $KK_2: y=ax^3+bx^2+cx+d_2$ $KK_3: y=ax^3+bx^2+cx+d_3$ $KK_4: y=ax^3+bx^2+cx+d_4$

In the five road model functions ($KK_0$ to $KK_4$), the respective coefficients a, b, and c are the same, and the coefficients d vary. In the x-y coordinate system in which the position of the host vehicle is the origin, the constant terms $d_0$, $d_1$, $d_2$, $d_3$, and $d_4$ in the road model functions correspond to the offset amount (the lateral position) of each road model function in the y-axis direction. The respective constant terms $d_0$, $d_1$, $d_2$, $d_3$, and $d_4$ show a lateral positional relationship between the travel lane boundary point groups parallel to each other, and show a relative positional relationship between the travel lane boundary point groups parallel to each other. While the present embodiment exemplifies the case in which the offset amount (the lateral position) in the y-axis direction is obtained from the respective road model functions ($KK_0$ to $KK_4$), the coordinates of the points SKa, SKb, and SKc on the y-axis in the one-dimensional histogram shown in FIG. 3B(b) may be used as the offset amounts (the lateral positions) of the travel lane boundary point groups. Such a determination can eliminate the calculation of the road model functions of the travel lane boundary point groups.

Figure 4B:
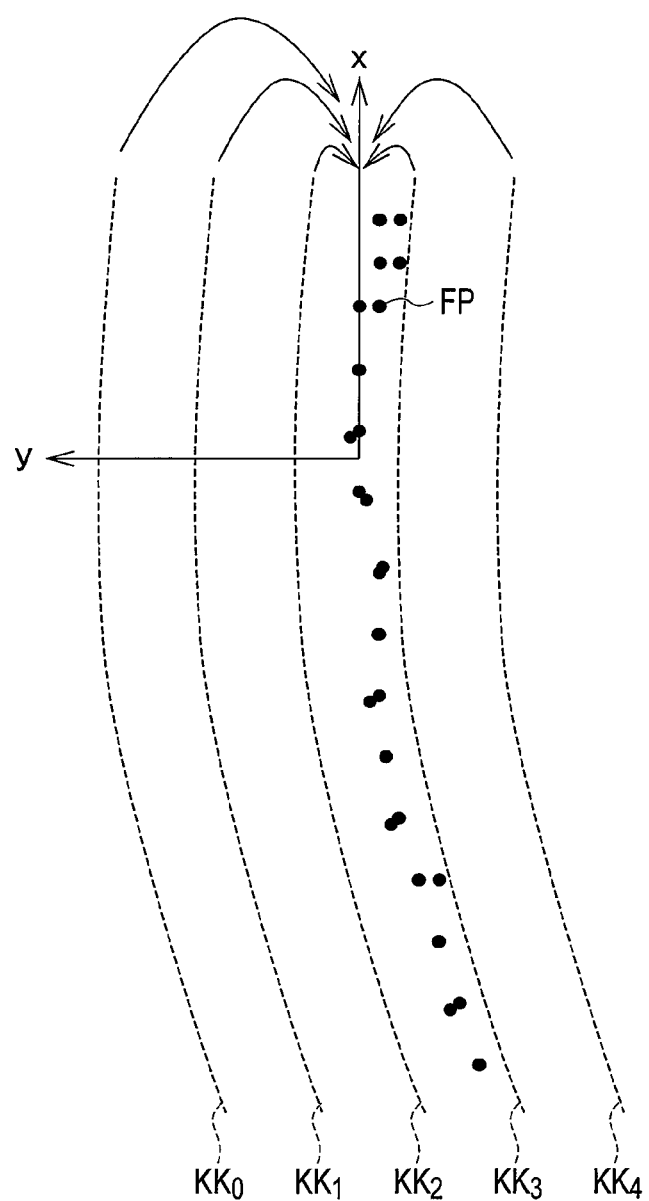
FIG. 4B is a bird's-eye view showing a state in which the travel lane characteristic points FP included in the parallel travel lane boundary point groups overlap each other.

When the plural travel lane boundary point groups parallel to each other are extracted, the travel lane outline estimation circuit 22 then moves the travel lane characteristic points FP, included in the respective parallel travel lane boundary point groups, in the direction of the y-axis opposite to the offset direction by the same amount as the offset amount ($d_0$, $d_1$, $d_2$, $d_3$, and $d_4$) of the respective fitted road model functions ($KK_0$ to $KK_4$), as shown in FIG. 4B. Accordingly, the travel lane outline estimation circuit 22 can overlap the travel lane characteristic points FP included in the travel lane boundary point groups parallel to each other. The travel lane characteristic points FP may overlap each other at the zero point of the y-axis, or may overlap each other such that one of the parallel travel lane boundary point groups remains at the original position, and all the rest are moved to the one travel lane boundary point group.

Figure 5A:
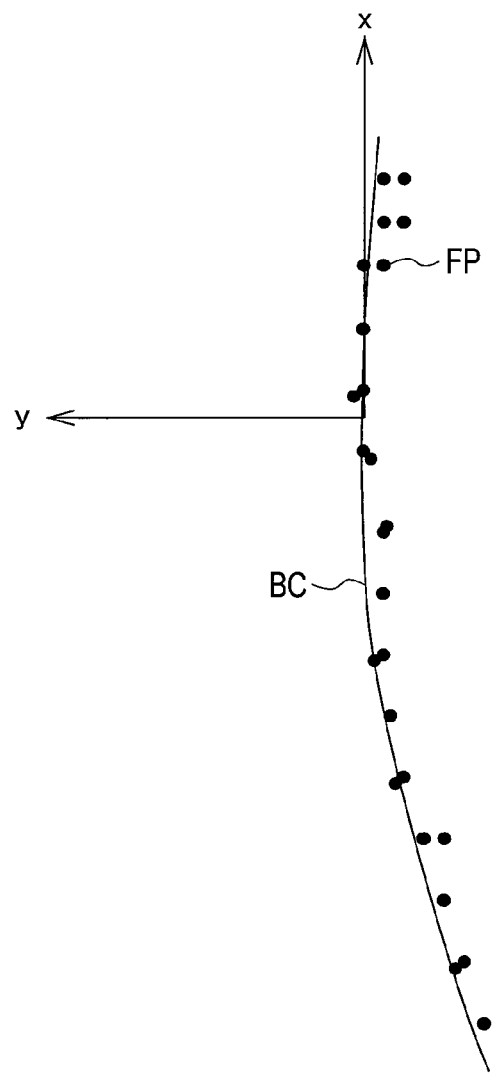
FIG. 5A is a bird's-eye view showing a travel lane outline BC estimated according to the travel lane characteristic points FP included in the overlapping travel lane boundary point groups.

The travel lane outline estimation circuit 22 estimates a travel lane outline BC based on the travel lane characteristic points FP included in the overlapped travel lane boundary point groups on the first circumferential map, as shown in FIG. 5A. In particular, the road model function is fitted to the overlapped travel lane boundary point groups. When the road model function is the cubic function ($y=ax^3+bx^2+cx+d$), the travel lane outline estimation circuit 22 calculates the coefficients a, b, c, and d. The travel lane outline BC is thus expressed by the road model function.

Figure 5B:
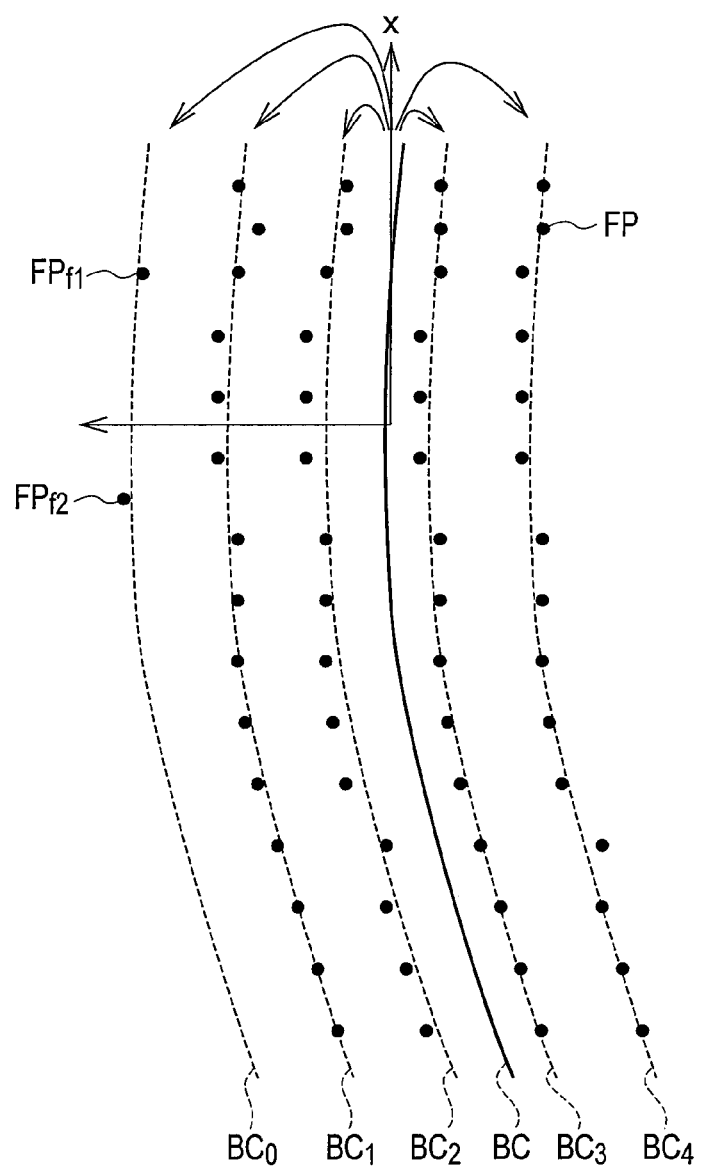
FIG. 5B is a bird's-eye view showing travel lane outlines ($BC_0$ to $BC_4$) shifted in the y-axis direction by the offset amounts (lateral positions: $d_0$ to $d_4$) of the road model functions ($KK_0$ to $KK_4$)

The travel lane boundary evaluation circuit 23 determines travel lane boundaries based on the lateral positions (the offset amounts) of the parallel travel lane boundary point groups and the travel lane outline BC. In particular, the travel lane boundary evaluation circuit 23 moves the travel lane outline BC in the y-axis direction by the offset amounts (the lateral positions: $d_0$ to $d_4$) of the road model functions ($KK_0$ to $KK_4$), as shown in FIG. 5B. In other words, the travel lane boundary evaluation circuit 23 reconstructs the travel lane boundaries, with the same shape as the travel lane outline BC, based on the travel lane outline BC and the positions (the y-coordinates) of the travel lane boundary point groups in the vehicle width direction.

The travel lane boundary evaluation circuit 23 determines the travel lane boundaries according to a degree of correspondence of the travel lane characteristic points included in the travel lane boundary point groups with the travel lane outlines ($BC_0$, $BC_1$, $BC_2$, $BC_3$, and $BC_4$). The travel lane boundary evaluation circuit 23 counts the number of the travel lane characteristic points having a distance from the respective travel lane outlines ($BC_0$, $BC_1$, $BC_2$, $BC_3$, and $BC_4$) shorter than a reference value so as to calculate the degree of correspondence. The travel lane boundary evaluation circuit 23 determines that the degree of correspondence is low when the number of the travel lane characteristic points counted is smaller than a predetermined value, and that the degree of correspondence is high when the number of the travel lane characteristic points counted is larger than or equal to the predetermined value. The travel lane boundary evaluation circuit 23 rejects the travel lane outline ($BC_0$) determined to have a degree of correspondence lower than the predetermined value as the travel lane outline is extracted from the travel lane characteristic points ($FP_{f1}$, $FP_{f2}$) detected incorrectly. The travel lane boundary evaluation circuit 23 determines that the travel lane outlines ($BC_1$, $BC_2$, $BC_3$, and $BC_4$) with a high degree of correspondence are the travel lane boundaries, so as to output travel lane position information including the determined travel lane boundaries as the travel lane detection result.

Figure 2:
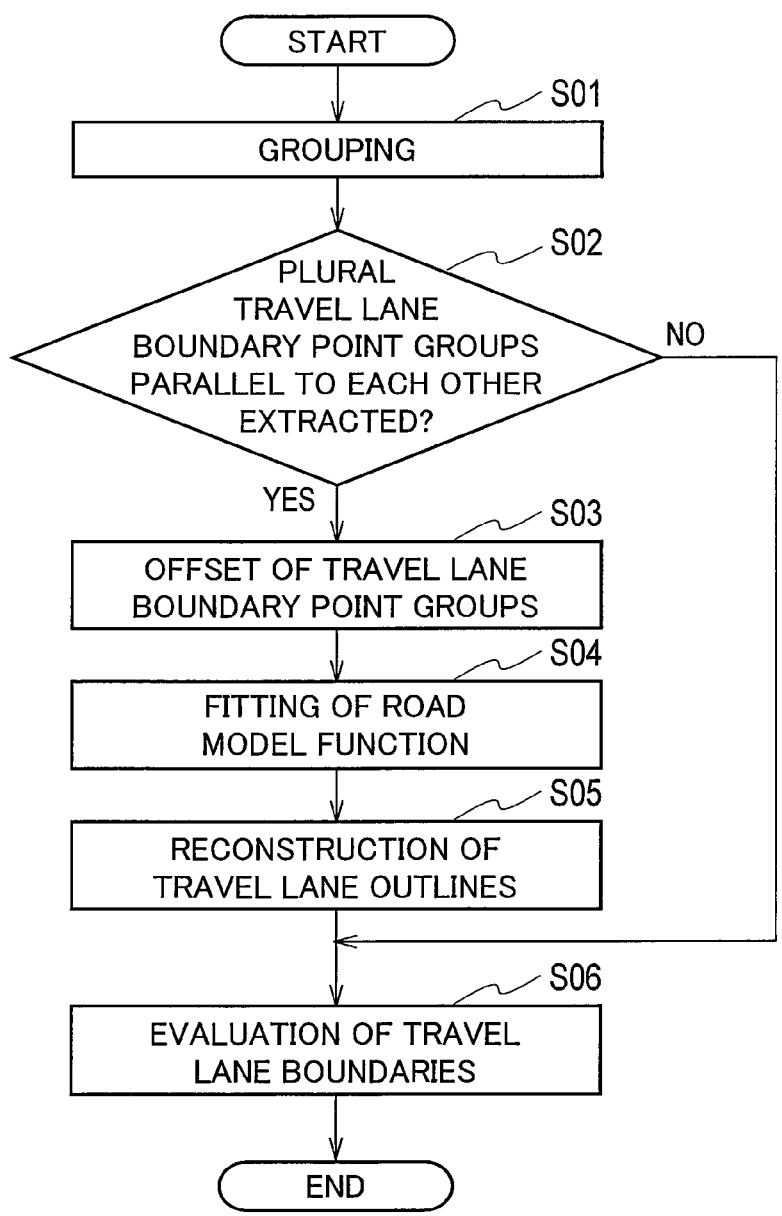
FIG. 2 is a flow chart illustrating a travel lane detection method using the travel lane detection device 1 shown in FIG. 1.

Next, an example of a travel lane detection method using the travel lane detection device 1 shown in FIG. 1 is described below with reference to a flow chart shown in FIG. 2. The following is an operating process performed by the travel lane detection circuit 12 included in the travel lane detection device 1. The processing shown in FIG. 2 is executed repeatedly in a predetermined cycle.

In step S01, the travel lane detection circuit 12 extracts a travel lane boundary group based on the continuity of a plurality of travel lane characteristic points FP, as described with reference to FIG. 3A, FIG. 3B(a), and FIG. 3B(b).

In particular, the circumferential map generation circuit 21 connects the respective travel lane characteristic points FP together measured at different times while taking account of the amount of movement of the vehicle. The circumferential map generation circuit 21 thus accumulates the detection histories of the travel lane characteristic points FP to generate the first circumferential map. The travel lane outline estimation circuit 22 extracts a travel lane boundary group based on the continuity of the plural travel lane characteristic points included in the first circumferential map. The travel lane outline estimation circuit 22 detects a peak in the histogram (the y-coordinate) shown in FIG. 3B(b), and makes the travel lane characteristic points FP into a group per peak included in the second circumferential map shown in FIG. 3B(a) so as to extract the travel lane boundary point group. The travel lane outline estimation circuit 22 then fits a curve expressed by a road model function to the travel lane boundary point group extracted. For example, the travel lane outline estimation circuit 22 calculates the coefficients a, b, c, and d of the cubic function ($y=ax^3+bx^2+cx+d$).

The process proceeds to step S02, and the travel lane outline estimation circuit 22 determines whether a plurality of travel lane boundary point groups parallel to each other are extracted in step S01. For example, the plural travel lane boundary point groups parallel to each other can be determined to be extracted when two or more peaks are detected in the one-dimensional histogram along the y-axis. Alternatively, the travel lane outline estimation circuit 22 may determine that the plural travel lane boundary point groups parallel to each other are extracted when the road model functions are used in which the respective coefficients a, b, and c are substantially the same and the coefficients d vary.

When it is determined to be YES in step S02, the processing of overlapping the plural travel lane boundary point groups parallel to each other can be executed, and the process proceeds to step S03. When it is determined to be NO in step S02, the overlapping processing cannot be executed, and the process proceeds to step S06.

In step S03, the travel lane outline estimation circuit 22 moves the travel lane characteristic points FP included in the respective travel lane boundary point groups parallel to each other in the direction of the y-axis opposite to the offset direction by the same amount as the offset amount ($d_0$ to $d_4$) of the respective fitted road model functions ($KK_0$ to $KK_4$), as shown in FIG. 4B. Accordingly, the travel lane outline estimation circuit 22 can overlap the plural travel lane boundary point groups parallel to each other.

In step S04, the travel lane outline estimation circuit 22 fits the road model function to the overlapped travel lane boundary point groups. The travel lane outline estimation circuit 22 thus can estimate the travel lane outline BC based on the travel lane characteristic points FP included in the overlapped travel lane boundary point groups on the first circumferential map as shown in FIG. 5A.

In step S05, the travel lane boundary evaluation circuit 23 moves the travel lane outline BC in the y-axis direction by the offset amounts (the lateral positions: $d_0$ to $d_4$) of the road model functions ($KK_0$ to $KK_4$), as shown in FIG. 5B. The travel lane boundary evaluation circuit 23 thus can reconstruct the travel lane boundaries based on the positions (the y-coordinates) of the travel lane boundary point groups in the vehicle width direction.

In step S06, the travel lane boundary evaluation circuit 23 determines the travel lane boundaries according to the degree of correspondence of the travel lane characteristic points included in the travel lane boundary point groups with the travel lane outlines ($BC_0$ to $BC_4$). In particular, the travel lane boundary evaluation circuit 23 calculates the degree of correspondence of the travel lane characteristic points with the travel lane outlines ($BC_0$ to $BC_4$). The travel lane boundary evaluation circuit 23 rejects the travel lane outline ($BC_0$) determined to have a degree of correspondence lower than the predetermined value as the travel lane outline is extracted from the travel lane characteristic points ($FP_{f1}$, $FP_{f2}$) detected incorrectly. The travel lane boundary evaluation circuit 23 determines that the travel lane outlines ($BC_1$ to $BC_4$) with a degree of correspondence higher than the predetermined value are the travel lane boundaries, so as to output the travel lane position information including the determined travel lane boundaries as the travel lane detection result.

When the travel lane boundary point groups parallel to each other are not extracted (NO in step S02), the travel lane boundary evaluation circuit 23 may calculate a degree of correspondence of the travel lane characteristic points FP with the road model function fitted in step S01, instead of the degree of correspondence with the travel lane outlines ($BC_1$ to $BC_4$) reconstructed in step S05.

(Modified Example of First Embodiment)

In regard to the processing of extracting the travel lane boundary point groups illustrated in step S01, the travel lane detection device 1 shown in FIG. 1 may construct preliminary lane groups based on the travel lane boundaries obtained in the previous processing cycle so as to extract the travel lane boundary point groups.

Figure 6:
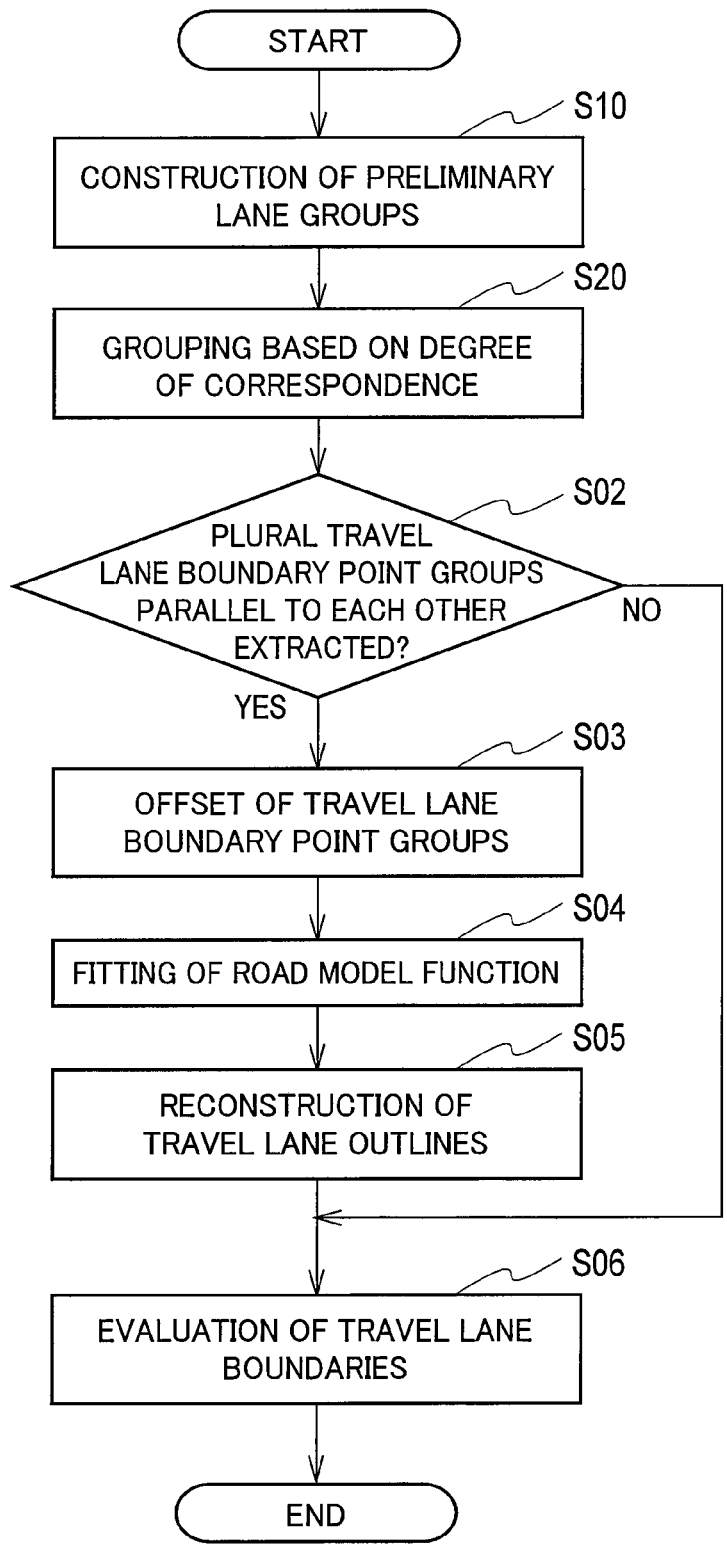
FIG. 6 is a flow chart illustrating a travel lane detection method according to a modified example of the first embodiment.

An example of a travel lane detection method according to a modified example of the first embodiment is described below with reference to a flow chart shown in FIG. 6. The following is an operating process performed by the travel lane detection circuit 12 included in the travel lane detection device 1. The processing shown in FIG. 6 is executed repeatedly in a predetermined cycle. The modified example executes steps S10 and S20, instead of step S01 in FIG. 2. The other steps S02 to S06 are the same as in FIG. 2, and explanations thereof are not repeated below.

Figure 7:
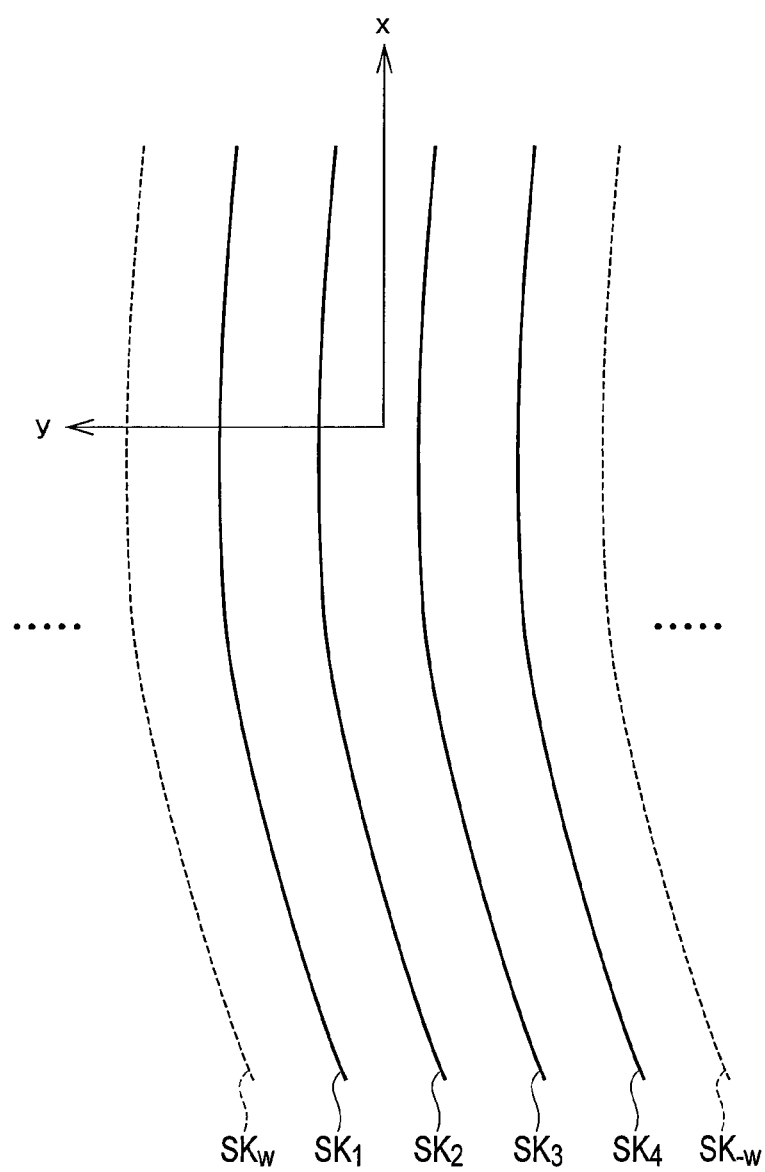
FIG. 7 is a bird's-eye view showing travel lane boundaries ($SK_1$, $SK_2$, $SK_3$, $SK_4$) obtained in a previous processing cycle.

In step S10, the travel lane outline estimation circuit 22 constructs preliminary lane groups by use of the travel lane boundaries obtained in the previous processing cycle. The following is a case in which four travel lane boundaries ($SK_1$, $SK_2$, $SK_3$, and $SK_4$) have been obtained in the previous processing cycle, as shown in FIG. 7.

$SK_1: y=a'x^3+b'x^2+c'x+d'_1$ $SK_2: y=a'x^3+b'x^2+c'x+d'_2$ $SK_3: y=a'x^3+b'x^2+c'x+d'_3$ $SK_4: y=a'x^3+b'x^2+c'x+d'_4$

In the four travel lane boundaries ($SK_1$ to $SK_4$), the respective coefficients a', b', and c' are the same, and the offset amounts (y-intercepts: $d'_1$ to $d'_4$) vary. The travel lane outline estimation circuit 22 obtains an average travel lane width (w) from the four travel lane boundaries ($SK_1$ to $SK_4$). Namely, the travel lane outline estimation circuit 22 calculates each distance (travel lane width) between the respective adjacent travel lane boundaries so as to obtain an average value (w) of the distances. The travel lane outline estimation circuit 22 then adds new travel lane boundaries ($SK_w$, $SK_{-w}$) with the travel lane width (w) on both sides of the four travel lane boundaries ($SK_1$ to $SK_4$). The travel lane outline estimation circuit 22 thus constructs six travel lane boundaries ($SK_1$ to $SK_4$, $SK_w$, $SK_{-w}$) in total as preliminary lane groups.

The modified example is illustrated with the case in which the preliminary lane groups are constructed by use of the travel lane boundaries obtained in the previous processing cycle, but is not limited to this illustration. For example, the preliminary lane groups may be constructed according to lane group information on map information.

The process proceeds to step S20, and the travel lane outline estimation circuit 22 makes the respective travel lane characteristic points FP into a group according to the degree of correspondence with the respective preliminary lane groups so as to extract a travel lane boundary point group. The travel lane outline estimation circuit 22 calculates distances between the travel lane characteristic points FP and the respective travel lane boundaries ($SK_1$ to $SK_4$, $SK_w$, $SK_{-w}$) composing the preliminary lane groups, and allots the respective travel lane characteristic points FP to the corresponding travel lane boundary ($SK_1$ to $SK_4$, $SK_w$, $SK_{-w}$) having the shortest distance therebetween. The travel lane outline estimation circuit 22 then makes the respective travel lane characteristic points FP allotted to the common travel lane boundary into a group so as to extract a single travel lane boundary point group.

When the coordinates of the respective travel lane characteristic points FP are defined as ($x_i$, $y_i$), and the respective travel lane boundaries are expressed by $y=a'x^3+b'x^2+c'x+d'$, the distances between the travel lane characteristic points FP and the travel lane boundaries are each obtained as an absolute value of $y_i-(a'x^3+b'x^2+c'x+d')$. The travel lane boundaries not supported by any travel lane characteristic points FP are rejected at this point.

The travel lane outline estimation circuit 22 then fits the cubic function to the travel lane characteristic point group allotted to the common travel lane boundary ($SK_1$ to $SK_4$, $SK_w$, $SK_{-w}$), and obtains the offset amount of the travel lane boundary from the origin of the coordinate system according to the obtained constant term (d), in a similar manner in step S01 in the first embodiment.

As described above, the first embodiment and the modified example can achieve the following effects.

The travel lane outline estimation circuit 22 estimates the travel lane outlines ($BC_0$ to $BC_4$), based on the travel lane characteristic points FP included in the overlapped travel lane boundary point groups, and the travel lane boundary evaluation circuit 23 determines the travel lane boundaries based on the lateral positions ($d_0$ to $d_4$) of the travel lane boundary point groups parallel to each other and the travel lane outlines ($BC_0$ to $BC_4$). As a result, the travel lane characteristic points belonging to a branch lane or the like not parallel to the other travel lanes can be excluded to estimate the travel lane outlines. Accordingly, the outlines of the main travel lane among currently-measured lanes can be estimated stably, and the information about the number of lanes and the lane width of the entire travel lanes and the like can be obtained.

The plural travel lane characteristic points included in the first circumferential map are characteristic points detected at different times and connected together in view of the amount of movement of the vehicle. Therefore, the travel lane outlines can be estimated with higher accuracy than a case in which the travel lane outlines are determined only by use of the travel lane characteristic points detected at once.

The travel lane boundary evaluation circuit 23 determines the travel lane boundaries based on the degree of correspondence (certainty) of the travel lane characteristic points included in the respective travel lane boundary point groups with the travel lane outlines ($BC_0$ to $BC_4$). Accordingly, other travel lane characteristic points ($FP_{f1}$, $FP_{f2}$) detected incorrectly or travel lane outlines estimated incorrectly can be rejected in accordance with the degree of correspondence.

(Second Embodiment)

A second embodiment is illustrated with a case of obtaining travel lane outlines and travel lane boundaries according to only travel lane characteristic points detected at once, instead of the travel lane characteristic points detected at different times and connected together while taking account of the amount of movement of the vehicle.

Figure 8:
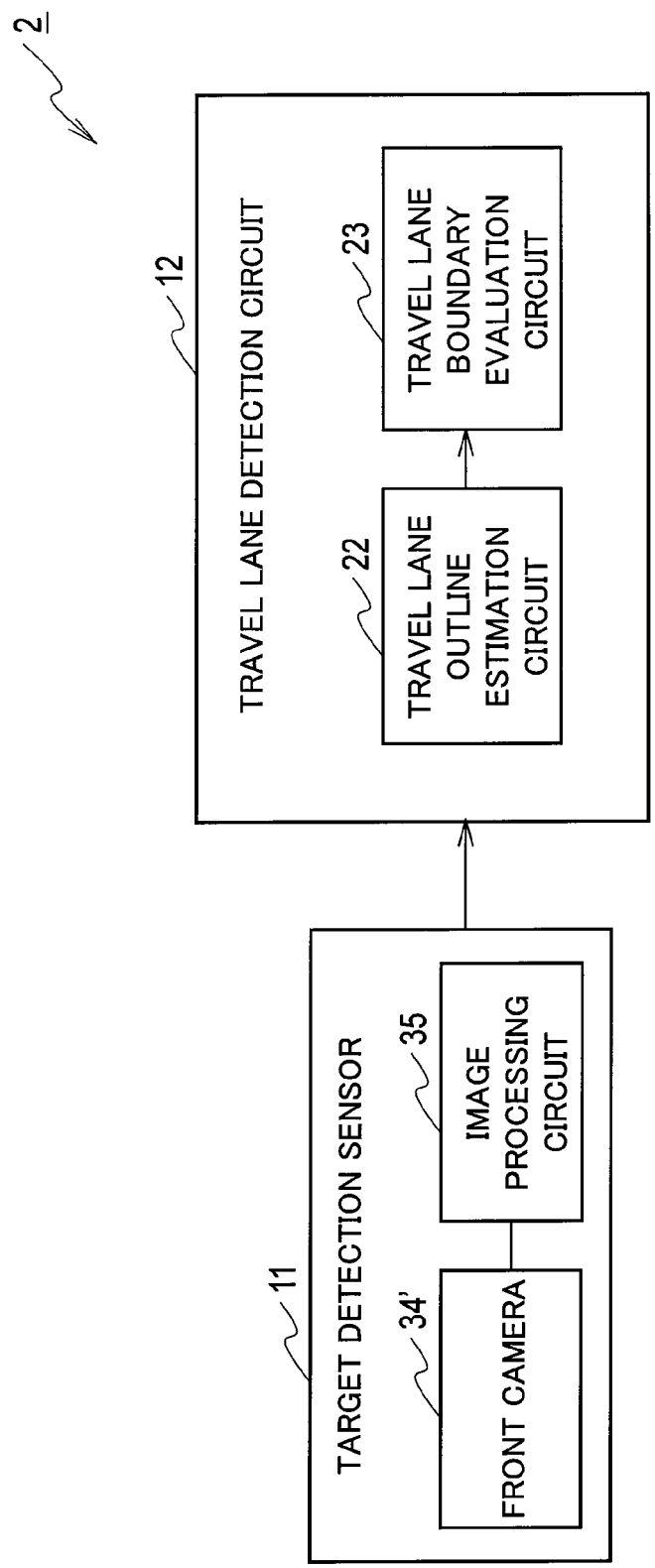
FIG. 8 is a block diagram showing a configuration of a travel lane detection device 2 according to a second embodiment.

A configuration of a travel lane detection device 2 according to the second embodiment is described below with reference to FIG. 8. The travel lane detection device 2 does not include the movement amount detection sensor 10 shown in FIG. 1, since it is not necessary to connect the travel lane characteristic points in view of the amount of movement of the vehicle to generate the first circumferential map. In addition, the travel lane detection circuit 12 does not include the circumferential map generation circuit 21 shown in FIG. 1. In the second embodiment, a camera 34' is installed in the vehicle with the capturing side directed to a road surface in the traveling direction. The other elements of the travel lane detection device 2 are the same as those in the travel lane detection device 1.

Figure 9A:
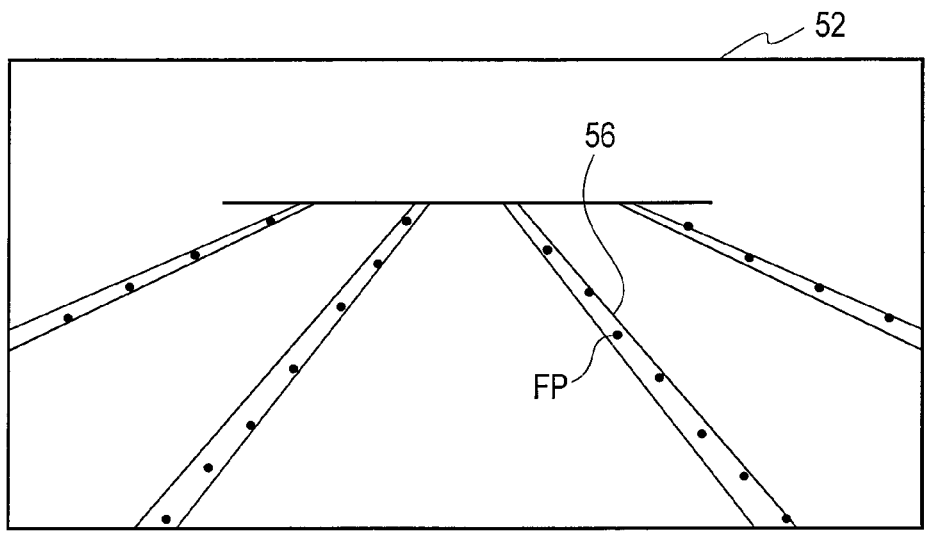
FIG. 9A is a view illustrating an image 52 captured by a camera 34' in FIG. 8.

The camera 34' is fixed to the front side inside the vehicle to capture road surface marks in front of the vehicle. FIG. 9A illustrates an image 52 captured by the camera 34'. The image 52 includes road surface marks (lane markers 56) indicating travel lane boundaries. The image processing circuit 35 detects, as travel lane characteristic points FP, edge points of the lane markers 56 of which brightness on the image 52 varies quickly or intermittently.

Figure 9B:
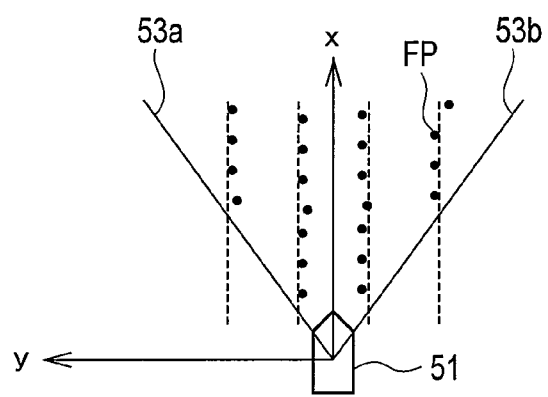
FIG. 9B is a bird's-eye view showing travel lane characteristic points FP converted to positions on bird's eye coordinates.

As shown in FIG. 9B, the travel lane outline estimation circuit 22 converts the positions of the detected travel lane characteristic points FP on the image 52 to positions on bird's-eye coordinates as viewed from above the vehicle 51. The travel lane outline estimation circuit 22 executes the viewpoint conversion processing based on an installation angle of the camera 34' to the road surface, which is an angle of the capturing direction to the road surface, and a distance from the camera 34' to the road surface. The travel lane outline estimation circuit 22 then groups the travel lane characteristic points FP in each travel lane boundary 56 so as to extract the travel lane characteristic point groups on the bird's-eye coordinates shown in FIG. 9B. The travel lane outline estimation circuit 22 executes the processing on the travel lane characteristic points FP indicated on the bird's-eye coordinates, instead of the first and second circumferential maps shown in FIG. 3A and FIG. 3B(a). The travel lane characteristic points FP shown in FIG. 9B are detected within the angle of view 53a, 53b of the camera 34'. When a frequency of the travel lane characteristic points FP on the coordinate in the vehicle width direction (the y-coordinate) is obtained, a histogram can be generated for the travel lane characteristic points on the image of a single frame in the same manner as illustrated in FIG. 3B(b). The travel lane outline estimation circuit 22 thus may determine the continuity of the plural travel lane characteristic points FP in accordance with the histogram.

The other operations of the travel lane outline estimation circuit 22 and the operations of the travel lane boundary evaluation circuit 23 are the same as those in the first embodiment or the modified example, and explanations thereof are not repeated below. A flow chart illustrating a travel lane detection method using the travel lane detection device 2 is common to the flow chart shown in FIG. 2 or FIG. 6.

As described above, the second embodiment can detect the travel lane outlines and the travel lane boundaries for a shorter time than the case of using the travel lane characteristic points detected at different times and connected together while taking account of the amount of movement of the vehicle. In addition, since the camera 34' captures the road surface marks drawn on the road surface in front of the vehicle 51, the travel lane detection device 2 can detect the travel lane boundaries in front of the vehicle 51, which cannot be obtained from the detection histories of the past travel lane characteristic points.

(Third Embodiment)

A third embodiment is illustrated with a case of, after detecting a main travel lane (a main line), searching again for a travel lane different from the main travel lane such as a branch lane. While the third embodiment exemplifies the case including the processing of searching for a branch lane after the processing of detecting the main travel lane as illustrated in the first embodiment (FIG. 2), the searching processing may be executed after the processing illustrated in the modified example or the second embodiment.

Figure 10:
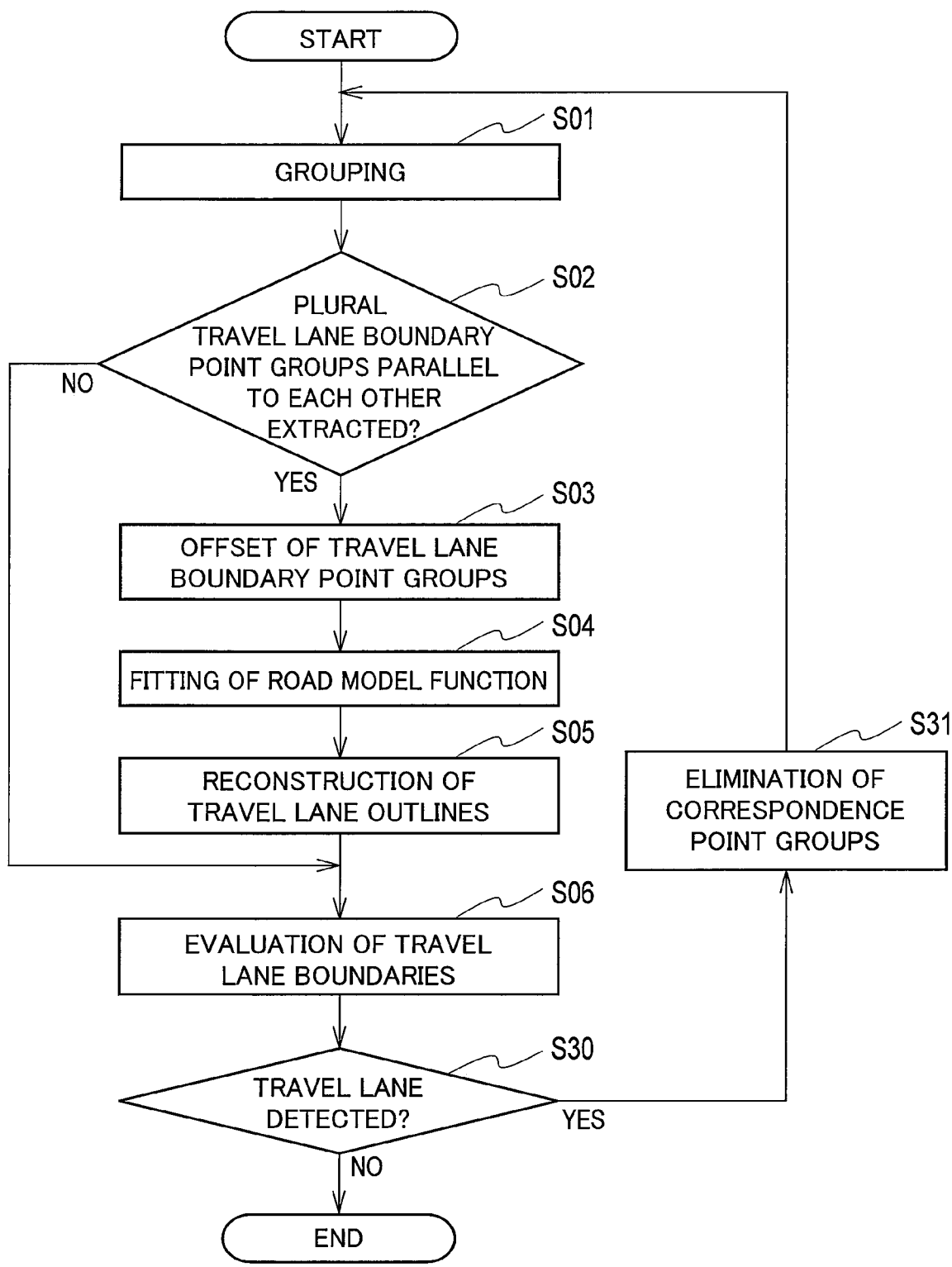
FIG. 10 is a flow chart illustrating a travel lane detection method according to a third embodiment.

An example of a travel lane detection method according to the third embodiment is described below with reference to a flow chart shown in FIG. 10. The following is an operating process performed by the travel lane detection circuit 12 included in the travel lane detection device 1. The processing shown in FIG. 10 is executed repeatedly in a predetermined cycle.

The steps S01 to S06 are the same as in the first embodiment, and explanations thereof are not repeated below.

The process proceeds to step S30 after the step S06, and the travel lane detection circuit 12 determines whether the travel lane outlines having a degree of correspondence higher than or equal to the reference value are detected in step S06. Namely, the travel lane detection circuit 12 determines whether there are travel lane outlines determined to be the travel lane boundaries having a degree of correspondence higher than or equal to the reference value. When the travel lane boundaries are detected (YES in step S30), the process returns to step S01 via step S31 in order to detect not only the travel lane boundaries of the main travel lane (the main line) but also travel lane boundaries of another travel lane (a branch lane). When no travel lane boundary is detected (NO in step S30), the travel lane detection circuit 12 outputs the travel lane position information, including the travel lane boundaries having been determined up to this point, and finishes the process.

Figure 11A:
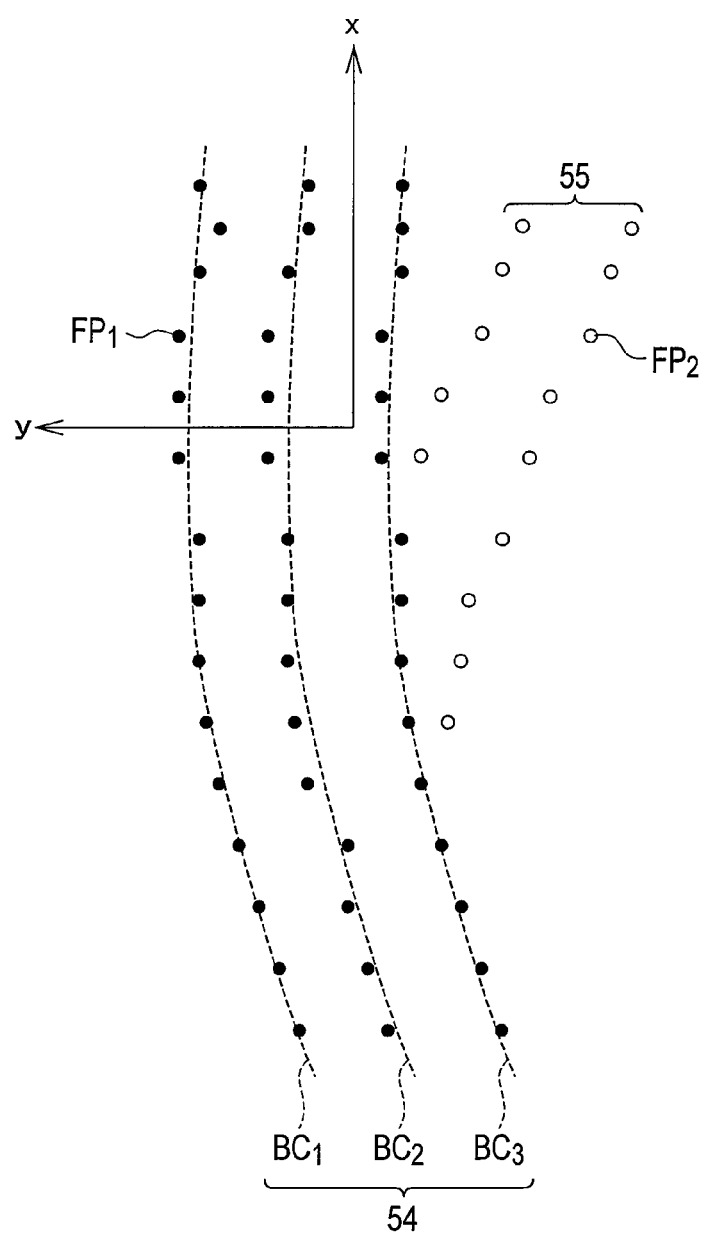
FIG. 11A is a bird's-eye view showing a plurality of travel lane characteristic points $FP_1$ supporting travel lane outlines ($BC_1$ to $BC_3$) of a main travel lane 54, and a plurality of travel lane characteristic points $FP_2$ belonging to a branch lane 55.

In step S31, the travel lane detection circuit 12 extracts the travel lane boundary point groups having a degree of correspondence of the travel lane characteristic points FP with the travel lane outlines lower than the predetermined value. For example, as shown in FIG. 11A, a plurality of travel lane characteristic points $FP_1$ supporting travel lane outlines ($BC_1$ to $BC_3$) of the main travel lane 54 (correspondence point groups) are eliminated, and travel lane characteristic points $FP_2$ not supporting the travel lane boundaries of the main travel lane 54 are only allowed to remain.

Figure 11B:
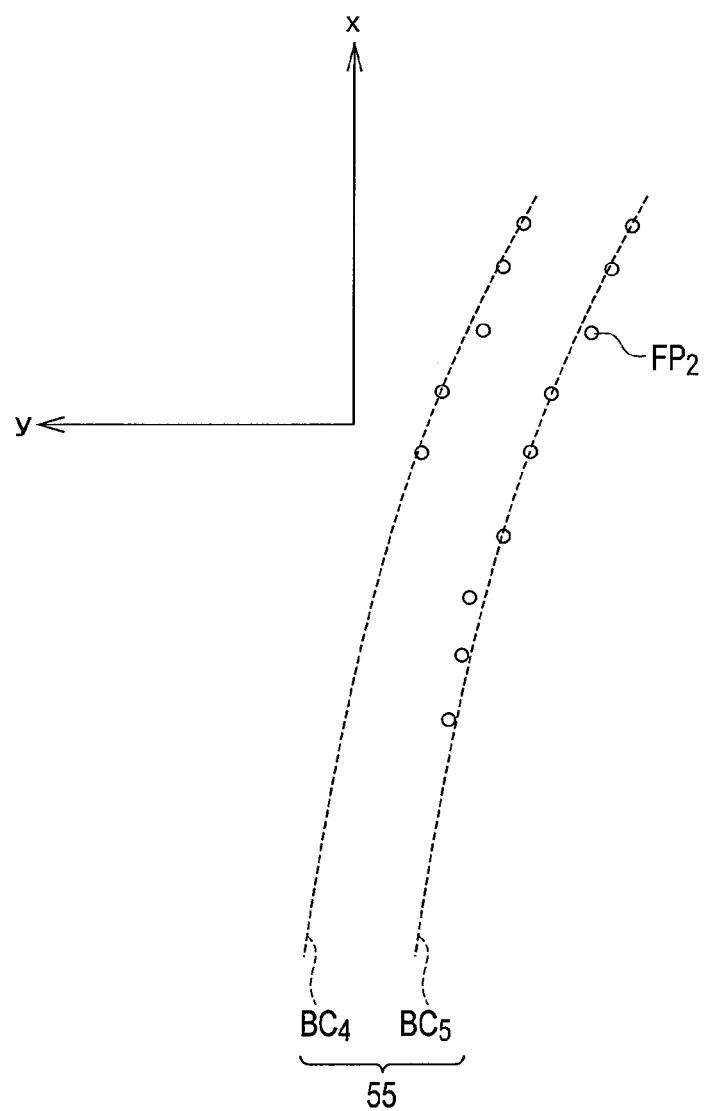
FIG. 11B is a bird's-eye view showing the travel lane characteristic points $FP_2$ supporting travel lane outlines ($BC_4$, $BC_5$) of the branch lane 55 and remaining after the travel lane characteristic points $FP_1$ are eliminated from FIG. 11A.

The process returns to step S01, and the travel lane detection circuit 12 groups the remaining travel lane characteristic points $FP_2$ to extract travel lane boundary point groups. Thereafter, the travel lane detection circuit 12 executes steps S02 to S06 again, so as to detect travel lane outlines ($BC_4$, $BC_5$) shown in FIG. 11B as travel lane boundaries of a branch lane 55. Thereafter, the process proceeds to step S31; however, since the example shown in FIG. 11A and FIG. 11B only includes the two lines of the main travel lane 54 and the branch lane 55, characteristic point groups, other than the travel lane boundary point groups composing the main line and the branch lane, are only detected after the branch lane is detected. In other words, since travel lane characteristic points not supporting the travel lane outlines ($BC_1$ to $BC_5$) do not remain, no travel lane boundary is detected in step S06, and it is thus determined to be NO in step S30. The travel lane detection circuit 12 then outputs the travel lane position information including the travel lane boundaries of the main line 54 and the branch lane 55 having been determined up to this point to finish the processing cycle.

As described above, the third embodiment extracts the travel lane boundary point groups having a degree of correspondence with the travel lane outlines ($BC_1$ to $BC_3$) lower than the predetermined value, and estimates the other travel lane outlines ($BC_4$, $BC_5$) based on the travel lane boundary point groups with a degree of correspondence lower than the predetermined value. Accordingly, not only the main travel lane outlines (the main travel lane) but also the other travel lane outlines (the branch lane or the like) can be estimated.

The first embodiment has exemplified the grouping processing on the travel lane characteristic points by use of the histogram. It should be understood that the second embodiment can use a histogram for the travel lane characteristic points FP on the image 52 of a single frame when a frequency on the coordinate in the vehicle width direction (the y-coordinate) is obtained. Similarly, the third embodiment may execute the grouping processing on the travel lane characteristic points using a histogram. For example, curves are caused to approximate to the travel lane characteristic points FP belonging to the branch lane 55 shown in FIG. 11B, so as to rearrange the x-axis to conform to the inclined direction of the approximating curves. Accordingly, the grouping processing on the travel lane characteristic points $FP_2$ by use of the histogram can be executed again.

The functions described in the respective embodiments may be implemented in one or more processing circuits. A processing circuit includes a programmed processing device such as a processing device including an electric circuit. Such a processing device includes an application specific integrated circuit (ASIC) configured to execute the functions described in the respective embodiments or a conventional circuit component.

While the respective embodiments are illustrated with the stand-alone travel lane detection device (1, 2) including the movement amount detection sensor 10 and the target detection sensor 11, the travel lane detection device may be of a client-server model using a computer network via a wireless communication network. In such a case, the vehicle 51 (the client), including the movement amount detection sensor 10 and the target detection sensor 11, is connected to the travel lane detection device (the server) via a computer network, for example. The server including the travel lane detection circuit 12 as shown in FIG. 1 or FIG. 8 thus can be connected to the movement amount detection sensor 10 and the target detection sensor 11 via a computer network. The travel lane detection device in this case includes mainly the travel lane detection circuit 12 (the server) without including the movement amount detection sensor 10 or the target detection sensor 11.

While the present invention has been described above with reference to the embodiments, it should be understood that the present invention is not intended to be limited to the embodiments described above, and various modifications and improvements will be apparent to those skilled in the art within the scope of the present invention.

REFERENCE SIGNS LIST

1, 2 TRAVEL LANE DETECTION DEVICE
10 MOVEMENT AMOUNT DETECTION SENS0R
11 TARGET DETECTION SENS0R
12 TRAVEL LANE DETECTION CIRCUIT
22 TRAVEL LANE OUTLINE ESTIMATION CIRCUIT
23 TRAVEL LANE BOUNDARY EVALUATION CIRCUIT
51 VEHICLE
$BC_0$ to $BC_5$ TRAVEL LANE OUTLINE
FP TRAVEL LANE CHARACTERISTIC POINT

The invention claimed is:

1. A travel lane detection method using a travel lane detection circuit for determining travel lane boundaries according to a plurality of travel lane characteristic points detected by a target detection sensor installed in a vehicle, the travel lane detection circuit being configured to execute the steps of:
   extracting a travel lane boundary point group based on continuity of the plurality of the travel lane characteristic points;
   when a plurality of travel lane boundary point groups parallel to each other are detected, overlapping the plurality of the travel lane boundary point groups by moving, in a respective first vehicle width direction, the travel lane characteristic points of each group of the plurality of the travel lane boundary point groups;
   estimating a travel lane outline according to the travel lane characteristic points included in the overlapped travel lane boundary point groups; and
   determining the travel lane boundaries by moving the estimated travel lane outline in a respective second vehicle width direction that is opposite of the respective first vehicle width direction.

2. The travel lane detection method according to claim 1, wherein the plurality of the travel lane characteristic points are detected at different times and connected together in view of an amount of movement of the vehicle.

3. The travel lane detection method according to claim 1, wherein the travel lane detection circuit determines the travel lane boundaries based on a degree of correspondence of the travel lane characteristic points included in the respective travel lane boundary point groups with the travel lane outline.

4. The travel lane detection method according to claim 1, wherein the travel lane detection circuit extracts the travel lane boundary point groups having a degree of correspondence of the travel lane characteristic points with the travel lane outline lower than a predetermined value, and estimates another travel lane outline based on the travel lane boundary point groups with the degree of correspondence lower than the predetermined value.

5. A travel lane detection device comprising a controller programmed to:
   extract a travel lane boundary point group according to a plurality of travel lane characteristic points detected by a target detection sensor installed in a vehicle;
   when a plurality of travel lane boundary point groups parallel to each other are detected, overlap the parallel travel lane boundary point groups by moving, in a first vehicle width direction, the travel lane characteristic points of each group of the plurality of the travel lane boundary point groups;
   estimate a travel lane outline according to the travel lane characteristic points included in the overlapped travel lane boundary point groups; and
   determine travel lane boundaries by moving the estimated travel lane outline in a second direction that is opposite the first vehicle width direction.

* * * * *